(12) United States Patent
Bohac et al.

(10) Patent No.: US 7,186,066 B2
(45) Date of Patent: Mar. 6, 2007

(54) METHOD OF LOADING AND UNLOADING TRANSPORTED COMPRESSIBLE ROLLS

(75) Inventors: Don E. Bohac, Magnolia, TX (US); Robert Felix, Houston, TX (US); Joe Boggs, Sweetwater, TX (US)

(73) Assignee: GSE Lining Technology, Houston, TX (US)

( * ) Notice: Subject to any disclaimer, the term of this patent is extended or adjusted under 35 U.S.C. 154(b) by 99 days.

(21) Appl. No.: 11/121,581

(22) Filed: May 4, 2005

(65) Prior Publication Data
US 2006/0251488 A1    Nov. 9, 2006

(51) Int. Cl.
*B60P 7/08*    (2006.01)
(52) U.S. Cl. .............................. 410/98; 410/35; 410/36; 410/40; 410/42; 410/49; 410/50
(58) Field of Classification Search .................. 410/32, 410/34–37, 39–40, 42, 47, 49–50, 97–99; 248/68.1; 206/391, 443, 446; 211/59.4, 211/70.4; 414/802, 809, 812; 105/355
See application file for complete search history.

(56) References Cited

U.S. PATENT DOCUMENTS 6,164,883 A * 12/2000 Wilcox ........................ 410/36

* cited by examiner

*Primary Examiner*—Stephen Gordon
(74) *Attorney, Agent, or Firm*—Wood, Phillips, Katz, Clark & Mortimer

(57) ABSTRACT

A method of securing large rolls of compressible materials on flat transport cars, including (a) placing a first set of longitudinally spaced U-shaped brackets on the transport car, each of the U-shaped brackets consisting of a horizontal cross member between a pair of vertical legs of a height no greater than the roll diameter, (b) loading a plurality of the large rolls on the cross member to define a first row of the rolls, (c) strapping the first row of rolls together, (d) repeating steps (a) and (b) with additional sets of brackets to stack a selected number of additional rows of rolls above the first row, wherein the brackets of each set are aligned with the brackets associated with the rows therebeneath with the legs connected to so as to carry a significant portion of the weight of the rolls, and (e) strapping selected adjacent rows of rolls together.

7 Claims, 7 Drawing Sheets

METHOD OF LOADING AND UNLOADING TRANSPORTED COMPRESSIBLE ROLLS

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward transporting materials, and particularly toward transporting large rolls of compressible materials.

BACKGROUND OF THE INVENTION AND TECHNICAL PROBLEMS POSED BY THE PRIOR ART

Long distance transportation of large objects is not unusual, given that the large objects are typically manufactured at limited locations though their use is desired in many locations. Such transportation is often conveniently accomplished by train and/or truck. For example, large pipes may be conveniently stacked on train cars and/or truck trailer beds. However, the amount of such objects which may be stacked on a single car and/or bed is limited by a number of factors, including load stability, weight and strength. For example, while pipes may be stacked on top of one another, they cannot be stacked so high as to crush the pipes on the bottom of the stack, nor may they be stacked in a manner which risks that they will dangerously break off of the stack or shift so as to cause the car or trailer to be dangerously imbalance and perhaps tip over during transport.

The above problems may be exacerbated when the object being transported is compressible. In such instances, it may be impossible to stack such objects on top of one another to any significant degree without risking that the bottom objects of the stack be damaged. One example of such compressible materials is large scale plastic polyethylene liners such as may be used for ground cover in a wide variety of applications such as land fills. Such liners are often provided in rolls which may range in length from 14 feet to 35 feet, and with a diameter of 18 inches to 46 inches. Heretofore, such rolls have often been transported in open top train cars, where the walls of the cars restrain the rolls. However, such a manner of transport has either been susceptible to damaging the rolls on the bottom of the load, and/or has required that limited numbers of rolls may be included on each car to prevent and/or minimize such damage. Further, such transport is limited by the availability of specialized open top cars, and the amount of rolls which can be carried on a single car are limited by the height of the car walls. Moreover, accessing the load for loading and unloading may be hindered by the presence of the car walls, with workers potentially hindered from reaching certain areas when necessary to connect and/or disconnect lifting structures.

The present invention is directed toward overcoming one or more of the problems set forth above.

SUMMARY OF THE INVENTION

In one aspect of the present invention, a method of securing large rolls of compressible materials on flat transport cars is provided, including the steps of (a) placing a first set of longitudinally spaced U-shaped brackets on the transport car, each of the U-shaped brackets consisting of a horizontal cross member between a pair of vertical legs of a height no greater than the roll diameter, (b) loading a plurality of the large rolls on the cross member to define a first row of the rolls, (c) strapping the first row of rolls together, (d) repeating steps (a) and (b) with additional sets of brackets to stack a selected number of additional rows of rolls above the first row, wherein the brackets of each set are aligned with the brackets associated with the rows thereebeneath with the legs connected to so as to carry a significant portion of the weight of the rolls, and (e) strapping selected adjacent rows of rolls together.

In one form of this aspect of the present invention, the brackets are aligned by telescopically connecting the legs in substantially vertical alignment. In a further form, the legs have axial openings, and the aligning is accomplished by inserting rigid members into the opening with the rigid members extending between adjacent legs.

In another form of this aspect of the present invention, one or more middle roll of each of the rows is chocked.

In still another form of this aspect of the present invention, the bracket legs are stacked to selectively support the cross members apart a distance less than the selected diameter.

In yet another form of this aspect of the present invention, the rows on the bracket cross members each have R rolls thereon and, after step (e), a first additional row having R-1 rolls is nested thereon, the first additional row is strapped to the row on which it is nested, and all of the rows are strapped together.

According to yet another form of this aspect of the invention, a method of transporting large rolls of compressible materials from a shipping location to a distribution center is provided, including the steps of securing the rolls on a flat transport car according this aspect of the invention, moving the flat transport car to the distribution center, and, at the distribution center, removing the rolls row by row from the flat transport car by releasing the straps around the top-most row and removing the rolls of the top-most row wherein. For each row on one of the bracket sets, removing further consists of (I) ensuring that at least one middle roll is chocked to prevent rolling of at least one middle one of the rolls, (ii) removing the rolls other than the at least one middle one of the rolls from the car, (iii) removing the at least one middle one of the rolls from the car last, and (iv) removing the U-shaped bracket which supported the removed rolls; and repeating steps (I)–(iv) for all rows destined for distribution from the distribution center.

In another aspect of the present invention, a support structure for transporting large rolls of compressible material on flat transport cars is provided, including a vertical base legs securable to a car, a plurality of U-shaped brackets having a horizontal cross member between two vertical legs of a height less than the roll diameter, and securing members adapted to secure the brackets with the legs stacked vertically with the cross members spaced vertically a distance less than the selected diameter. The cross member is adapted to support a row of a plurality of the rolls of compressible material, and the bracket cross members are adapted to secure rolls of the compressible material thereon with the secured legs supporting a substantial portion of the weight of the rolls located above the bottom row.

In one form of this aspect of the present invention, the securing members comprise longitudinal joining members sized to fit within a central openings of the legs. In a further form, the securing members are selectively securable to the legs. In a still further form, means are provided for releasably securing the joining member in selected legs of the brackets, whereby the joining members each extend into the central opening of adjacent bracket legs stacked vertically on top of one another.

In another form of this aspect of the present invention, sets of straps are adapted to extend about one or more rows, wherein every row secured by one set of straps is also secured to at least one other row by a second set of straps.

DETAILED DESCRIPTION OF THE INVENTION

Figure 1:
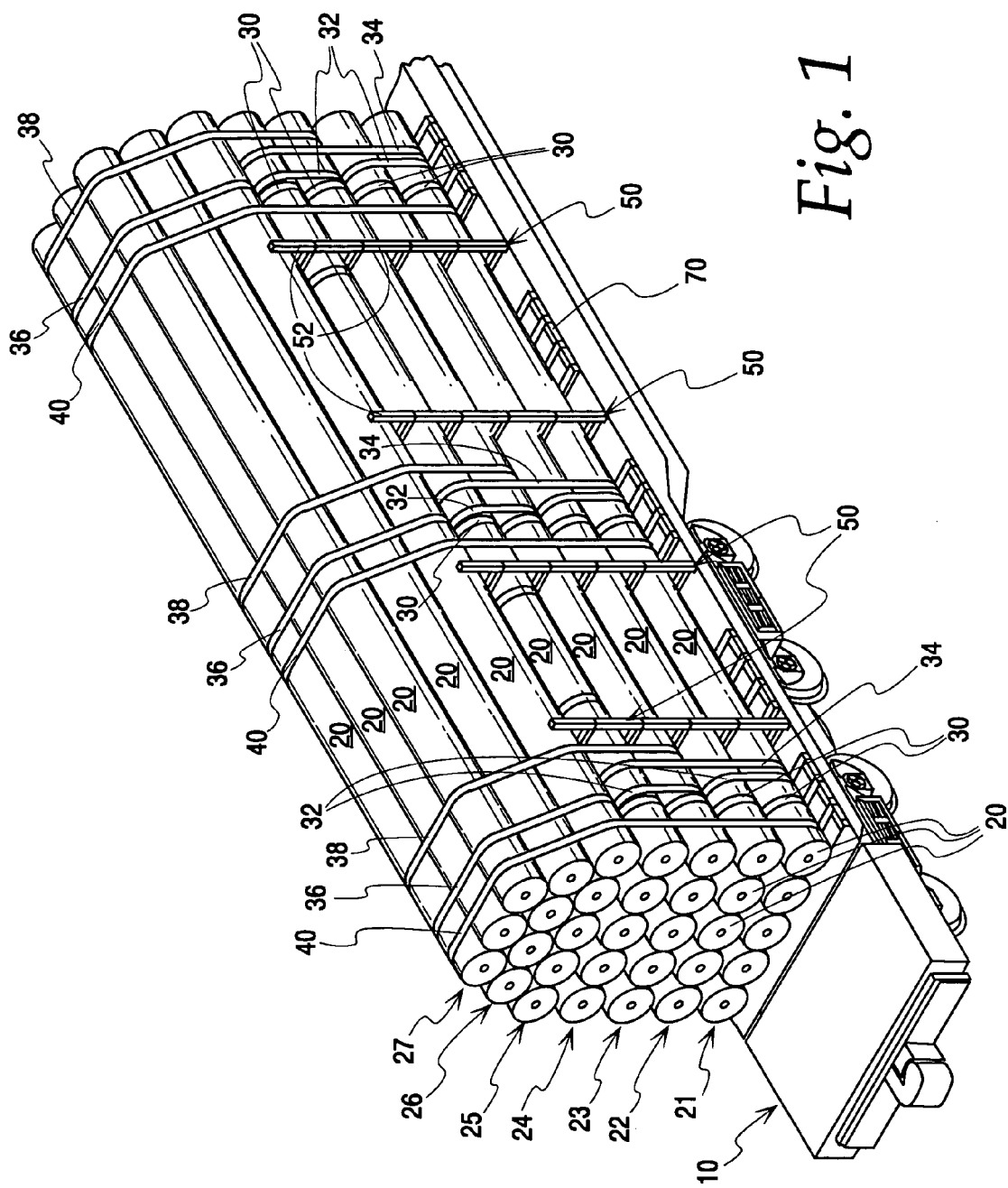
FIG. 1 is an illustration of a railroad car on which are stacked large rolls of compressible materials according to the present invention.

FIG. 1 illustrates a flatbed railroad car 10 on which a plurality of large rolls 20 of compressible materials are stacked thereon according to the present invention for transport. While a railroad car 10 is illustrated, it should be understood that the present invention could also be advantageously used for transport of rolls 20 on other large vehicles, such as truck trailers.

In the illustrated embodiment, there are four rows 21, 22, 23, 24 of five rolls 20 each topped by three nesting rows 25, 26, 27 of five, four and three rolls 20 respectively.

The rows 21–27 of the rolls 20 are advantageously variously banded together for stability, for example, by four inch nylon straps. For example, in the illustrated structure with seven rows 21–27:

a. A set of suitable bands or straps 30 is provided around each of the bottom four rows 21–24 at spaced locations along the length of the rolls 20.
b. Additional sets of bands or straps 32 are also provided around the bottom two rows 21–22 and the next two rows 23–24.
c. A set of bands 34 is provided around the bottom four rows 21–24.
d. The top three rows 25–27 are secured together by a set of bands or straps 36.
e. Additional set of bands 38 extends around the top three rows 25–27 and the two rows 23–24 therebeneath.
f. Finally a set of straps or bands 40 also extends around all of the rows 21–27.

It should be appreciated that the exact number and arrangement of bands will be dependent upon the particular rolls 20 and arrangement of rolls 20 used in a given instance, and that the present invention is not limited to the above described and illustrated arrangement of rolls 20, rows 21–27 and band sets 30–40. For example, the present invention may be advantageously usable in instances where larger or smaller rolls are used, and/or in which more or less than five rolls as illustrated are included in each roll, and/or more or less rows of rolls are stacked. Further, it should be appreciated that the number of bands in each set of bands may vary depending upon the size and weight of the rolls 20, as well as the strength of the bands 30–40, and that the invention is not limited to the specific arrangement of bands 30–40 illustrated in the detailed example of the Figures. However, it should be appreciated that the band sets 30–40 should most advantageously overlap, whereby individual groups of rolls 20 secured by one band set are additionally secured to other groups of rolls 20 by other band sets, and that each set of bands 30–40 will include at least two bands, generally near the opposite ends of the rolls 20. However, the bands should not be placed too near the ends of the rolls 20 to prevent them from possibly snagging on the ends due to movement which occurs during transport.

Figure 7:
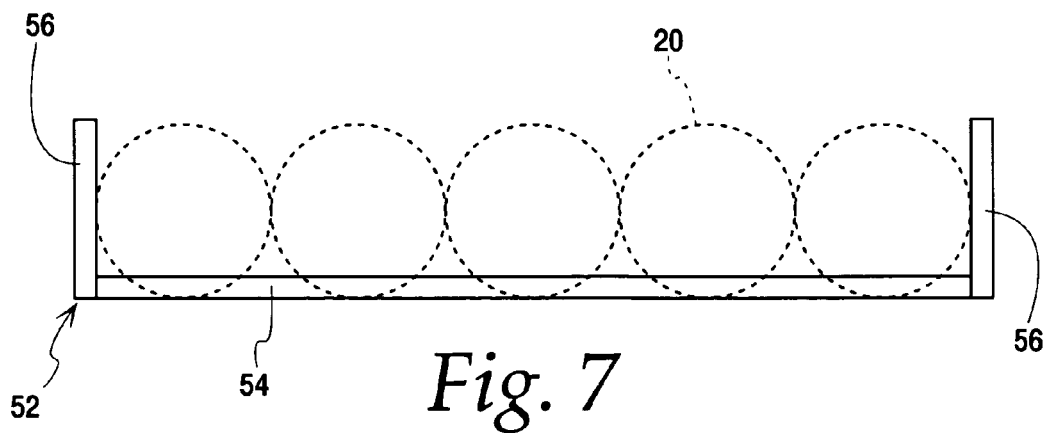
FIG. 7 is a side view of a bracket as used in the illustrated embodiment of FIGS. 1–6.
Figure 8:
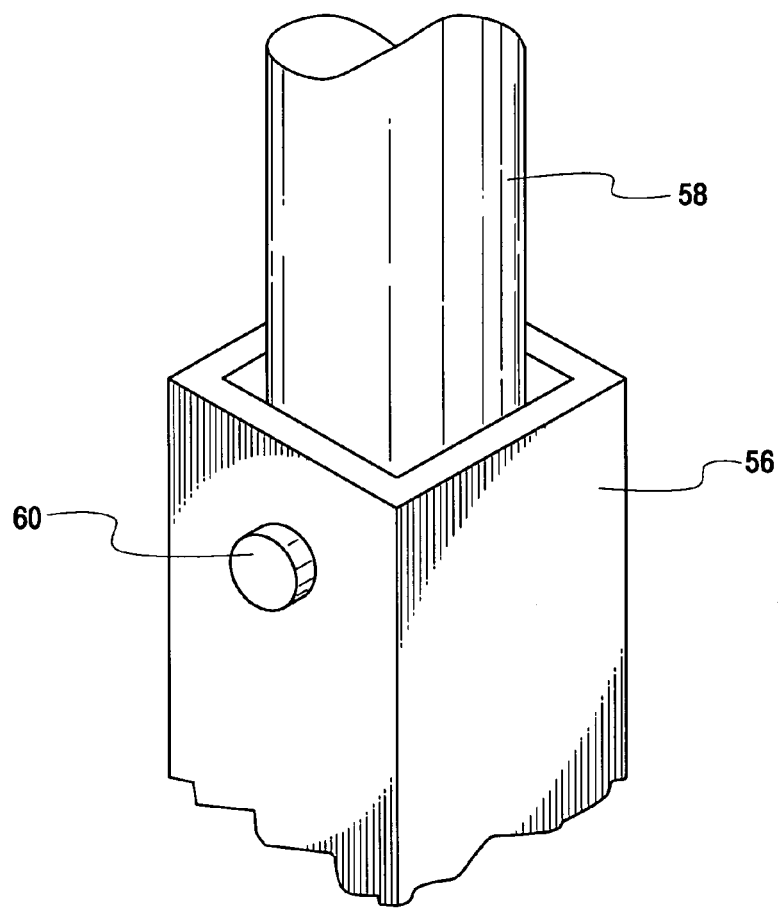
FIG. 8 is a perspective view of a portion of a bracket leg with a connecting pipe.

Each full width row 21–25 of rolls 20 is also advantageously supported by a support frame 50 defined by U-shaped brackets 52. As best illustrated in FIG. 7, the brackets 52 include a cross member 54 with parallel legs 56 on opposite ends.

Advantageously, the bracket legs 56 may have a height which is approximately the diameter of the rolls 20 expected to be transported. In this manner, allowing for some compression of the material of the rolls 20 resting on the cross member 54 (as illustrated by the rolls 20 shown in phantom in FIG. 7), each roll 20 of rows 21–24 may support substantially only its own weight as it rests on the cross member 54, without weighing down significantly on the roll 20 therebeneath, and without being significantly weighed down by rolls 20 above it.

The support frame 50 consists of brackets 52 suitably stacked with the legs 56 aligned so as to support the weight of the rows 21–27 through the leg height. Specifically, suitable aligning configurations may be used, such as a hollow leg 56 within which a suitably strong support 58 (e.g., a steel pipe 58) may be telescopically received. The pipe 58 is supported to extend from the upper end of the leg 56, for example, by a bolt 60 through the leg 56, whereby the hollow bottom of the leg 56 of a bracket 52 stacked thereon is held in stacked alignment. Further, the stacking support between the legs 56 may be provided, for example, by direct abutment of the legs 56, or may be provided by securing the pipe 58 to both legs 56, or by the pipe 58 abutting the bolts 60 of stacked legs 56 on opposite ends of the pipe 58, with the pipes 58 in those cases providing the vertical support between the legs 56. Moreover, it should be appreciated that the brackets 52 may be advantageously stacked without being secured together whereby the brackets 52 may be removed by simply lifting them from above without requiring disconnecting of any latch or lock or the like.

The lowermost bracket 52 may be suitably secured to the bed of the train car 10. Alternatively, it should be appreciated that the bed of the car 10 may serve to support the bottom row 21, and individual legs may be suitably mounted to project from the car bed, without connection by any cross member. Suitable pallets or load spreading mats 70 may also be provided at the bottom, as well as pallets or other suitable separators or spacers 72 (e.g., 2"×4" timber or ¾" sheets of 4'×8' plywood) (see, e.g., FIG. 2) between the rows 21–25 if desired, to facilitate later unloading of the rolls 20, including placement and removal of the straps or bands. Pallets 70 at the bottom of the load may provide spacing to allow for later addition of bands or straps should they be deemed necessary (e.g., if other bands 30–40 happen to break during transport before reaching the desired destination).

It should be appreciated that still other removably stackable bracket leg structures may be used within the broad aspect of the present invention, with the brackets suitably configured to support the weight of a row of rolls 20 disposed on the cross member 54, with a substantial portion of the weight of the rolls 20 supported through the stacked legs 56. To accommodate different size rolls, for example, the pipe 58 may be selectively securable to different positions on the legs 58, whereby different selected spacings between the cross members 54 may be provided. Alternatively, different length pipes could be used depending on the required spacing between rolls. Also, the legs 56 could be adjustable in length to accommodate different rolls 20 (with different diameters), for example, with spacers provided for placement over the pipes 58 when larger diameter rolls 20 are used, whereby the weight is transmitted through the stack of aligned spacers and legs 56. It should also be appreciated that the U-shaped brackets 52 could be downwardly open within the scope of the present invention. The important requirement is that the brackets serve to support significant amounts of the weight of the rows through the compression of the aligned legs 56.

It should further be appreciated that the width of the brackets 52 (i.e., the length of the cross members 54) may advantageously be substantially a multiple of the diameter of the rolls 20 expected to be transported. In that manner, the rolls 20 may be located between the legs 56 with minimal lateral spacing, whereby minimal undesirable side to side load shifting will be possible. However, such a size is not required within the broad scope of the present invention, and the width of the cross members 54 may instead, for example, be selected to maximize the width within the restrictions of the transport vehicle such as the railroad car 10. Moreover, suitable chocks 74 (see, e.g., FIG. 2) may be advantageously used to restrict side to side shifting of the rolls 20. Such chocks 74, when used, may be advantageously secured, for example, to the spacers 72, to prevent displacement in transit. It has been found that the chocks 74 perform most advantageously if not positioned too tightly against the rolls 20 in order to minimize any tearing which might result, for example, from impacts during transport. Guide rails may also be advantageously provided along the inside of the floor chocks in order to eliminate the snagging of bands and the material on the rolls 20.

Reference will now be had to FIGS. 2–6 which illustrate the process or method according to which rolls 20 transported as illustrated in FIG. 1 may be safely and advantageously unloaded from the railroad car 10 at its intended destination.

First, the bands 36, 38,40 extending around the upper three rows 25–27 are suitably removed (e.g., by cutting). At that point, the rolls 20 of the top (seventh) row 27 may be suitably lifted from the stack (e.g., by a lifting crane such as is known in the art), preferably one at a time. After the top row is removed, the rolls 20 of the next (sixth) row 26 are similarly removed. Since these rolls 20 nest between the rolls of the rows therebeneath, there is no great risk of the rolls rolling laterally during as each is removed.

At this point, the bottom five rows 21–25 remain, each row consisting of five rolls 20 supported between bracket legs 56.

Removal of the remaining top row (the fifth row) 25 is accomplished as follows. First, it should be ensured that the center roll 20c is chocked. If the row 25 is was not chocked prior to transport, suitable chocks 74 should be provided to ensure that the center roll 20c will not roll laterally. With the center roll 20c so secured, two rolls 20a, 20b on one side may be suitably lifted, and then the two rolls 20d, 20e on the other side may similarly be lifted. At that point, the center roll 20c may be safely lifted. It should be appreciated that unloading in this manner will safely ensure that the load is not overloaded on one side or the other, as might otherwise occur as a result of load shifting during transport, and thereby any danger of tipping over of the load may be avoided.

Figure 2:
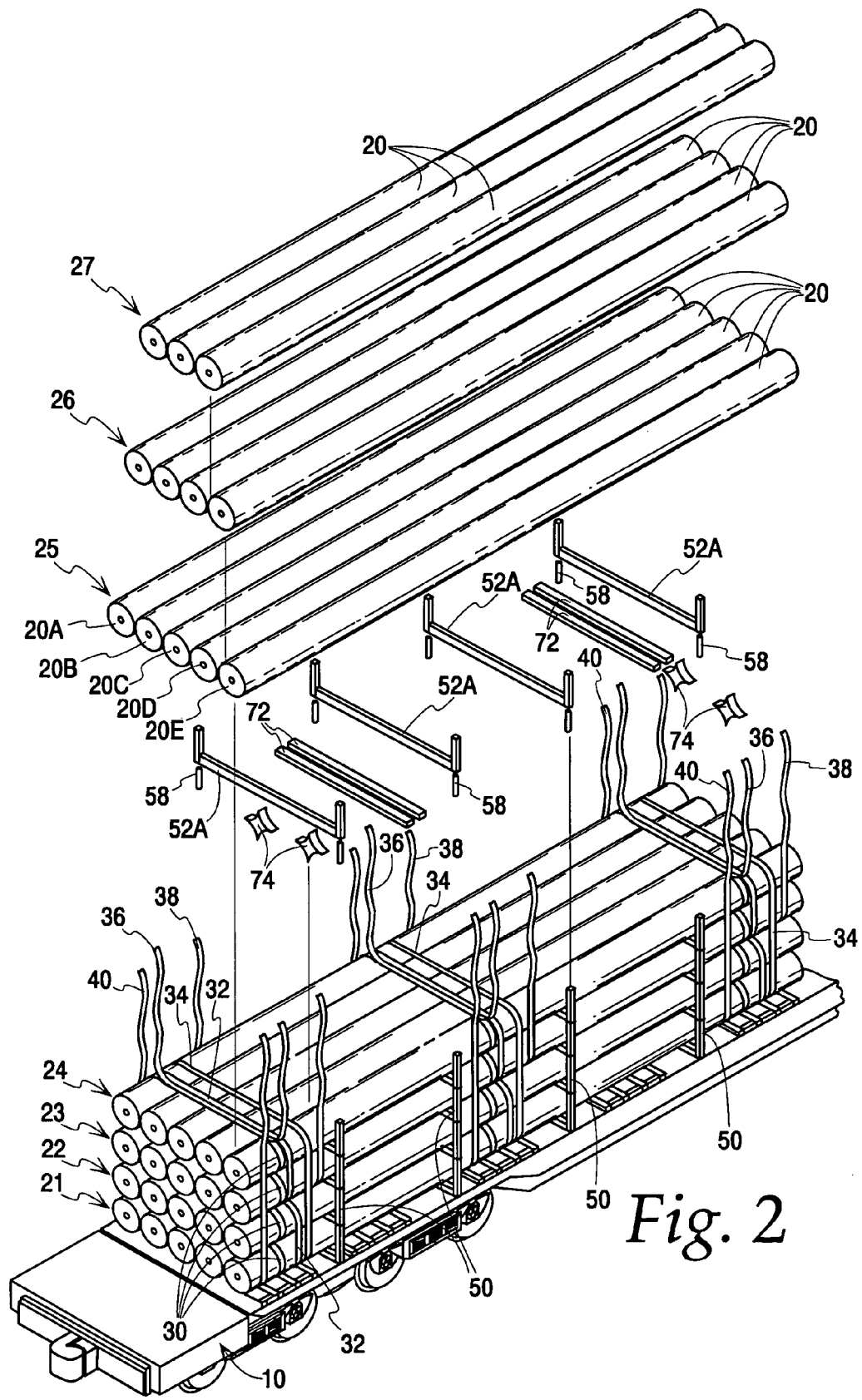
FIG. 2 is an exploded view of the FIG. 1 structure highlighting the arrangement of the top three rows.

Once the fifth row 25 is removed, the brackets 52a supporting that row may be lifted off of the brackets 52b therebeneath as shown in FIG. 2. At least straps 36 may also be easily pulled clear, as well as the chocks 74, thereby exposing the fourth row 24 as the top row.

Figure 3:
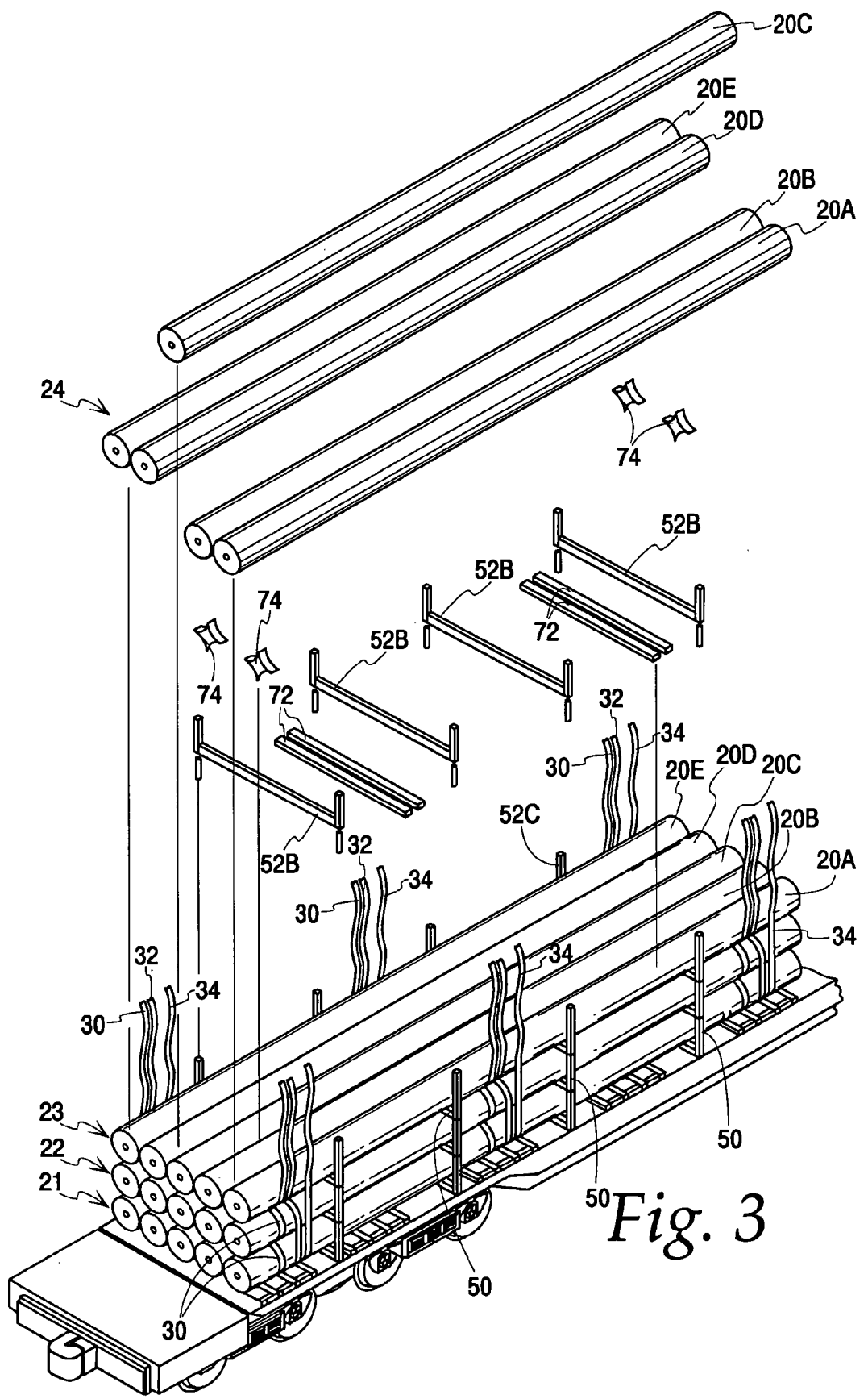
FIG. 3 is an exploded view of the FIG. 1 structure with the top three rows removed and highlighting the arrangement of the fourth row.

The fourth row 24 may then be suitably removed in a manner similar to that described for the fifth row 25, with any remaining bands extending around it suitably removed (e.g., bands 30, 32 and 34), and the center roll 20c suitably chocked and then two rolls 20a, 20b removed from one side, then two rolls 20d, 20e removed from the other side, then finally the center roll 20c. At that point, the brackets 52b, spacers 72 (if any), and the chocks 74 are removed to expose the third row 23 as the top row as illustrated in FIG. 3.

Figure 4:
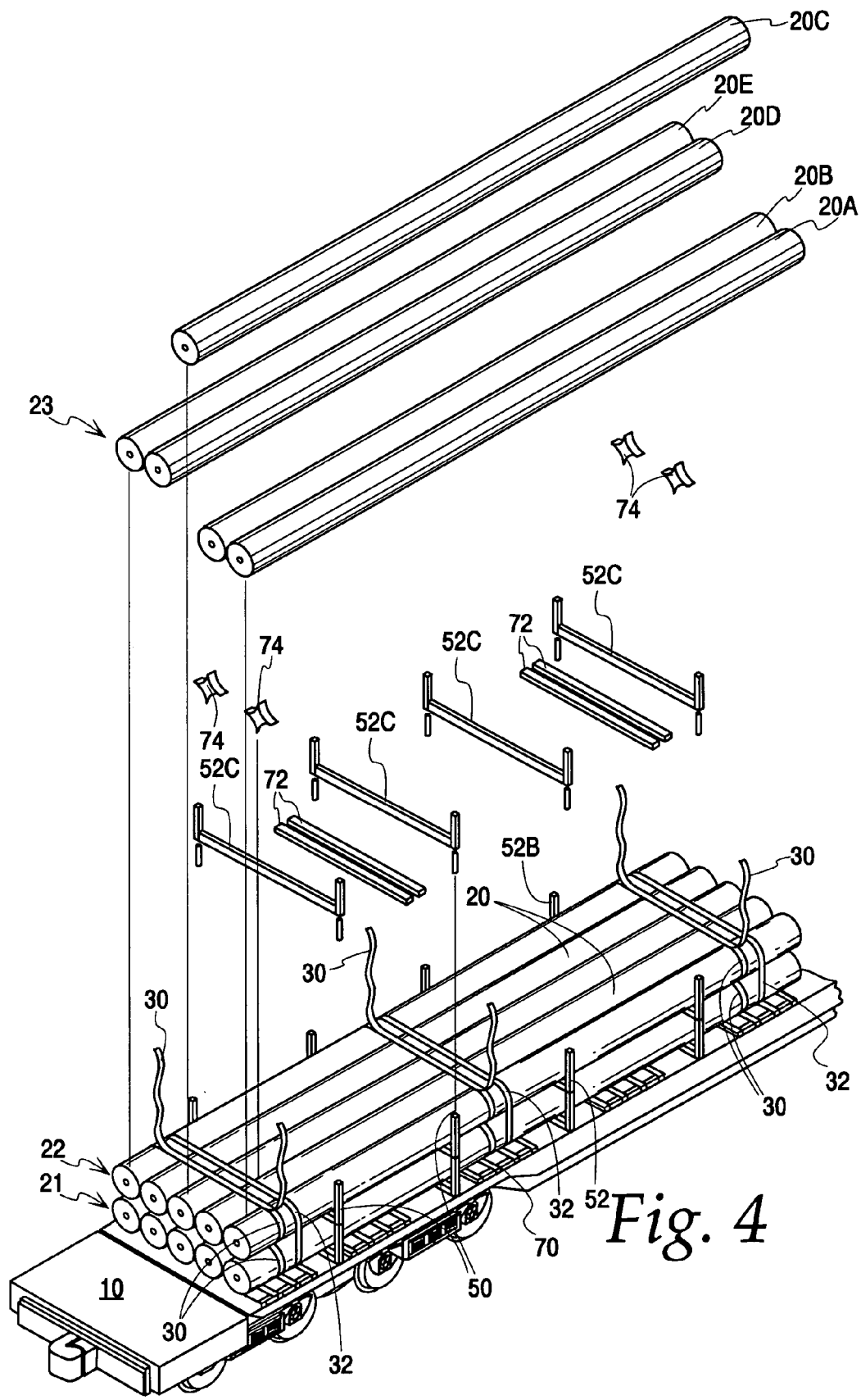
FIG. 4 is an exploded view of the FIG. 1 structure with the top four rows removed and highlighting the arrangement of the third row.
Figure 5:
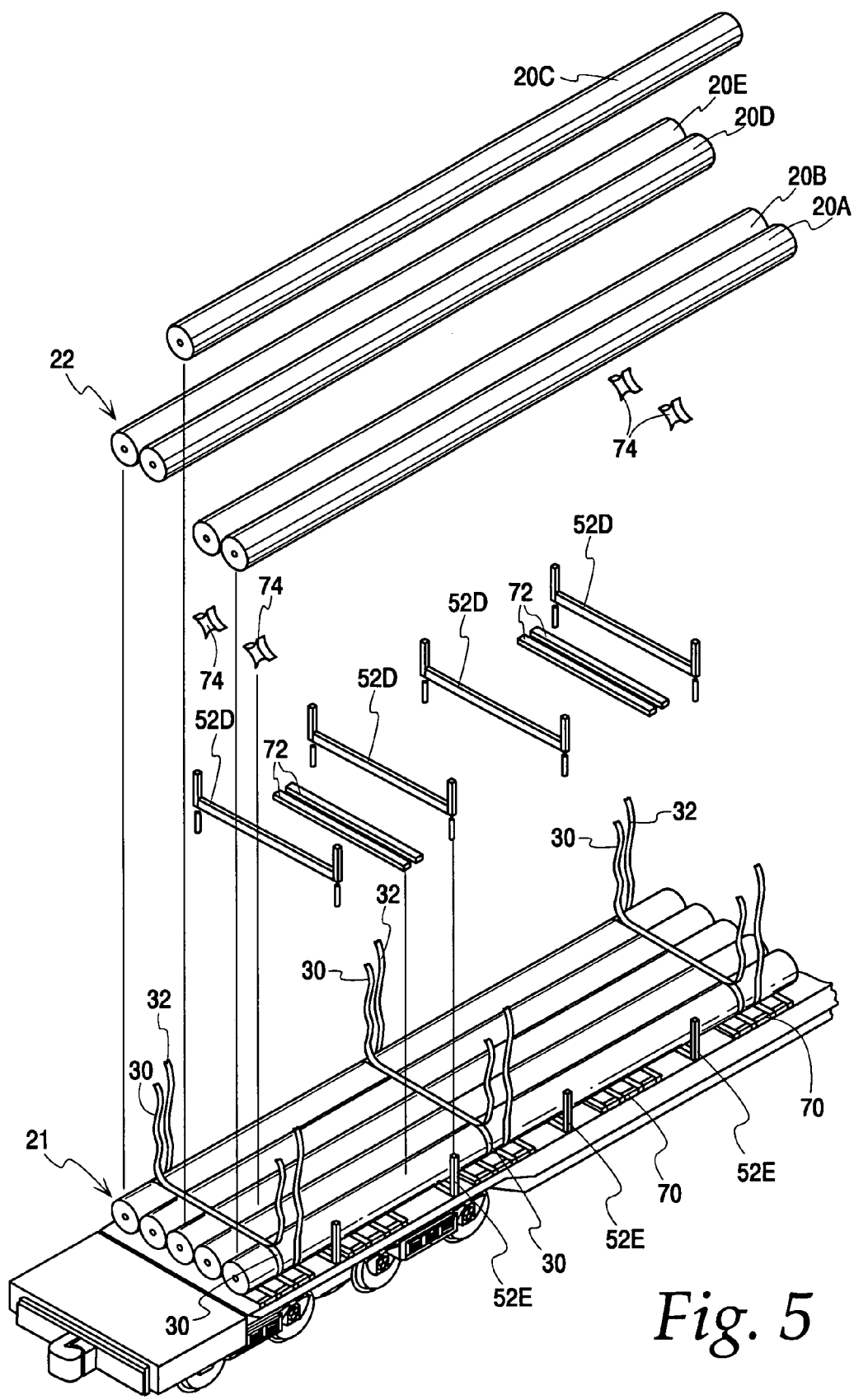
FIG. 5 is an exploded view of the FIG. 1 structure with the top five rows removed and highlighting the arrangement of the second row.
Figure 6:
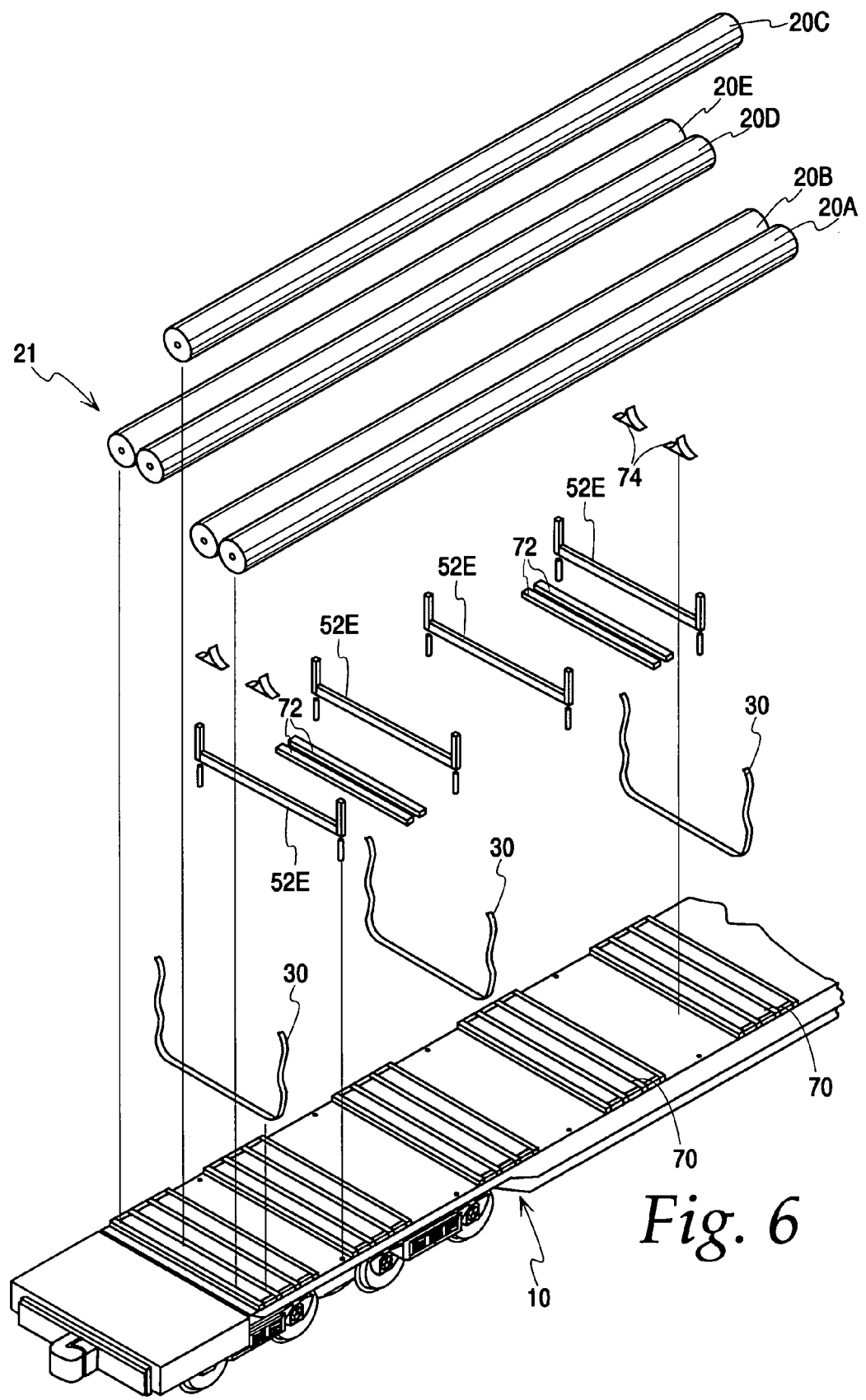
FIG. 6 is an exploded view of the FIG. 1 structure with the top six rows removed and highlighting the arrangement of the first row.

Removal of the third row 23, then the second row 22, then the bottom row 21 may follow in a similar manner as illustrated in FIGS. 4–6. However, it should be appreciated that the necessity to remove the center roll 20c last is reduced for the lower rolls given that the risk of tipping of the load is reduced for lower rows given the lower height.

It should be appreciated that loading of a railroad car 10 in accordance with the present invention may proceed in essentially inverse order to the above described unloading process.

Specifically, the first row 21 may first be loaded onto the bottom brackets 52e resting on the car 10, together with any desired pallets 70, spacers 72 and chocks 74 (as shown in FIG. 6). Further, all bands 30, 32, 34, 40 which wrap beneath the bottom row 21 may also be laid on the car 10 beneath the row 21 (though only band set 30 is illustrated in FIG. 6).

Once all the rolls of the first row 21 are in place and the bands secured therearound are secured (i.e., band set 30), the next set of brackets 52d is suitably stacked on the bottom brackets 52e, along with any other desired pallets 70, spacers 72, chocks 74 and any new bands 30 extending beneath the second row 22. The rolls 20 of the second row 22 are then added on the cross members 54 of the second set of brackets 52d, and all bands secured over the top of that row 22 are secured (i.e., bands 30 and 32).

This process is repeated for the third, fourth and fifth rows 23–25, with bands laid beneath and secured over the rows as appropriate (i.e., band sets 30, 32 and 38 lay beneath the third row 23 and band set 30 is secured over the third row 23; band set 30 lays beneath the fourth row 24 and band sets 30, 32 and 34 are secured over the fourth row 24; and band set 36 lays beneath the fifth row 25).

Thereafter, the rolls 20 of the sixth row 26 are nested on top of the rolls 20 of the fifth row 25, and then the rolls 20 of the seventh row 27 are nested on top of the rolls 20 of the sixth row 26.

Finally, the band sets 36, 38, 40 extending over the top (seventh) row 27 are secured therearound. It should be appreciated that the above loading and unloading process enable the safe, reliable and efficient transport of large rolls of compressible materials.

It should now be appreciated that the present invention provides a loading and unloading method by which large rolls of compressible materials may be easily, reliably, safely and efficiently transported over long distances, wherein the integrity of the rolls may be protected during such transport.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A method of securing large rolls of compressible materials on flat transport cars, said rolls having a selected diameter, comprising the steps of:
   (a) placing a first set of longitudinally spaced U-shaped brackets on a transport car, each of said U-shaped brackets consisting of a horizontal cross member between a pair of vertical legs of a height no greater than said selected diameter;
   (b) loading a plurality of said large rolls on said cross member to define a first row of said rolls;
   (c) strapping said first row of rolls together;
   (d) repeating steps (a) and (b) with additional sets of brackets to stack a selected number of additional rows of rolls above said first row, wherein said brackets of each set are aligned with the brackets associated with the rows therebeneath with said legs connected so as to carry a significant portion of the weight of said rolls; and
   (e) strapping selected adjacent rows of rolls together.

2. The method of claim 1, further comprising aligning said brackets by telescopically connecting said legs in substantially vertical alignment.

3. The method of claim 2, wherein said legs have axial openings, and said aligning is accomplished by inserting rigid members into each said opening, said rigid members extending between adjacent legs.

4. The method of claim 1, further comprising chocking one or more middle rolls of each of said rows.

5. The method of claim 1, wherein said bracket legs are stacked to selectively support said cross members apart a distance less than said selected diameter.

6. The method of claim 1, wherein said rows on said bracket cross members each have R rolls thereon, and further comprising after step (e):
   (f) nesting a first additional row thereon, said row having R-1 rolls;
   (g) strapping said first additional row to the row on which it is nested; and
   (h) strapping all of said rows together.

7. A method of transporting large rolls of compressible materials from a shipping location to a distribution center, comprising:

securing said rolls on said flat transport car according to claim 1;

moving said flat transport car to said distribution center;

at said distribution center, removing said rolls row by row from said flat transport car by releasing straps around the top-most row and removing said rolls of said top-most row wherein, for each row on one of said bracket sets, removing further comprises
   (i) ensuring that at least one middle roll is chocked to prevent rolling of at least one middle one of said rolls,
   (ii) removing the rolls other than the at least one middle one of said rolls from said car,
   (iii) removing the at least one middle one of said rolls from said car last, and
   (iv) removing each said U-shaped bracket which supported said removed rolls; and repeating steps (i)–(iv) for all rows destined for distribution from said distribution center.

* * * * *